(12) United States Patent
Omiatek et al.

(10) Patent No.: US 9,027,851 B2
(45) Date of Patent: May 12, 2015

(54) INSECTICIDE SPRAYER AND ROTARY SPRAY HEAD ASSEMBLY

(71) Applicant: Clarke Mosquito Control Products, Inc., Roselle, IL (US)

(72) Inventors: Dave Omiatek, McHenry, IL (US); Paul Tomaszek, Crystal Lake, IL (US)

(73) Assignee: Clarke Mosquito Control Products, Inc., St. Charles, IL (US)

( * ) Notice: Subject to any disclaimer, the term of this patent is extended or adjusted under 35 U.S.C. 154(b) by 0 days.

(21) Appl. No.: 14/359,694

(22) PCT Filed: Feb. 20, 2013

(86) PCT No.: PCT/US2013/026862
§ 371 (c)(1),
(2) Date: May 21, 2014

(87) PCT Pub. No.: WO2013/126406
PCT Pub. Date: Aug. 29, 2013

(65) Prior Publication Data
US 2014/0306030 A1    Oct. 16, 2014

Related U.S. Application Data

(60) Provisional application No. 61/600,910, filed on Feb. 20, 2012.

(51) Int. Cl.
*A01M 7/00*       (2006.01)
*B05B 3/10*       (2006.01)
*B05B 3/02*       (2006.01)

(52) U.S. Cl.
CPC ........... *A01M 7/0003* (2013.01); *A01M 7/0028* (2013.01); *B05B 3/10* (2013.01); *B05B 3/02* (2013.01)

(58) Field of Classification Search
CPC .......... A01M 7/0028; B05B 3/10; B05B 3/02
USPC .............. 239/225.1, 237, 240, 380, 461, 214, 239/222, 223, 224, 263.1
See application file for complete search history.

(56) References Cited

U.S. PATENT DOCUMENTS 2,986,338 A * 5/1961 Foster ........................... 239/222
3,398,893 A * 8/1968 Rasovich et al. ................ 239/77

(Continued)

FOREIGN PATENT DOCUMENTS

KR    10-2004-0077458 A    9/2004

OTHER PUBLICATIONS

International Search Report and Written Opinion of the International Searching Authority received in International Patent Application No. PCT/US2013/026862, mailed May 31, 2013.

*Primary Examiner* — Justin Jonaitis
(74) *Attorney, Agent, or Firm* — Michael Best & Friedrich LLP

(57) ABSTRACT

A rotary spray head assembly includes a motor having an output shaft and a housing through which the output shaft at least partially extends. The housing includes an inlet communicable with a source of fluid. The rotary spray head assembly also includes an annular skirt extending from the housing, a passageway through the skirt having a first end in fluid communication with the inlet and a second end, and a hub coupled for co-rotation with the output shaft. The hub includes an annular groove into which the annular skirt at least partially extends, a circumferential interior surface at least partially defining the groove, and an aperture through the circumferential interior surface. Fluid introduced into the annular groove through the second end of the passageway is discharged outwardly through the aperture.

18 Claims, 7 Drawing Sheets

(56) References Cited

U.S. PATENT DOCUMENTS

| | | | | |
|---|---|---|---|---|
| 3,719,168 A | * | 3/1973 | Kazee | 118/306 |
| 4,505,430 A | * | 3/1985 | Rodgers et al. | 239/112 |
| 4,741,479 A | * | 5/1988 | Wills et al. | 239/214.25 |
| 4,795,095 A | * | 1/1989 | Shepard | 239/214.17 |
| 5,037,029 A | * | 8/1991 | Garet et al. | 239/77 |
| 5,326,228 A | | 7/1994 | Armitage et al. | |
| 2002/0100815 A1 | | 8/2002 | Doebler et al. | |
| 2004/0217199 A1 | | 11/2004 | Bryan et al. | |
| 2005/0284951 A1 | | 12/2005 | Clarke et al. | |

* cited by examiner

INSECTICIDE SPRAYER AND ROTARY SPRAY HEAD ASSEMBLY

CROSS-REFERENCE TO RELATED APPLICATIONS

This application claims priority to U.S. Provisional Patent Application No. 61/600,910 filed Feb. 20, 2012, the entire content of which is incorporated herein by reference.

FIELD OF THE INVENTION

The present invention relates to sprayers, and more particularly to rotary spray head assemblies for use therein.

BACKGROUND OF THE INVENTION

Insecticide sprayers are commonly mounted for transportation on a vehicle through a mosquito-infested region. Such sprayers atomize liquid insecticide for dispersal throughout the mosquito-infested region as the vehicle upon which the sprayer is mounted drives through the region.

SUMMARY OF THE INVENTION

The invention provides, in one aspect, a rotary spray head assembly including a motor having an output shaft and a housing through which the output shaft at least partially extends. The housing includes an inlet communicable with a source of fluid. The rotary spray head assembly also includes an annular skirt extending from the housing, a passageway through the skirt having a first end in fluid communication with the inlet and a second end, and a hub coupled for co-rotation with the output shaft. The hub includes an annular groove into which the annular skirt at least partially extends, a circumferential interior surface at least partially defining the groove, and an aperture through the circumferential interior surface. Fluid introduced into the annular groove through the second end of the passageway is discharged outwardly through the aperture.

The invention provides, in another aspect, a fluid sprayer including a fluid storage module having at least one fluid tank, and a dispersion module having a rotary spray head assembly in fluid communication with the tank to receive fluid therefrom, the rotary spray head assembly further atomizing the fluid, and a blower assembly positioned upstream of the rotary spray head assembly for dispersing the atomized fluid from the rotary spray head assembly into the surroundings of the fluid sprayer. The fluid storage module is detachably coupled to the dispersion module to effect reconfiguration of the fluid sprayer between a first configuration in which the fluid storage module and the dispersion module are positioned in a side-by-side manner, and a second configuration in which the fluid storage module and the dispersion module are positioned inline with each other.

Other features and aspects of the invention will become apparent by consideration of the following detailed description and accompanying drawings.

BRIEF DESCRIPTION OF THE DRAWINGS

FIG. 1 is a cross-sectional view through a rotary spray head assembly in accordance with an embodiment of the invention.

FIG. 2 is a side view of a portion of the rotary spray head assembly of FIG. 2, illustrating a partial cutaway of a porous sleeve of the rotary spray head assembly.

FIG. 3 is a bottom perspective view of the portion of the rotary spray head assembly shown in FIG. 2.

FIG. 4 is a front perspective view of a fluid sprayer of the invention in which the rotary spray head assembly of FIG. 1 is incorporated, illustrating a fluid storage module and a dispersion module of the sprayer positioned inline with each other.

FIG. 5 is an enlarged view of the fluid sprayer of FIG. 4.

FIG. 6 is enlarged view of the fluid sprayer of FIG. 4, illustrating the fluid storage module being detached from the dispersion module of the sprayer.

FIG. 7 is a front perspective view of the fluid sprayer of the invention in which the rotary spray head assembly of FIG. 1 is incorporated, illustrating the fluid storage module and the dispersion module positioned in a side-by-side manner.

FIG. 8 is a cross-sectional view through a rotary spray head assembly in accordance with another embodiment of the invention.

FIG. 9 is a side view of a portion of the rotary spray head assembly of FIG. 8, illustrating a partial cutaway of a porous sleeve of the rotary spray head assembly.

FIG. 10 is a bottom perspective view of the portion of the rotary spray head assembly shown in FIG. 9.

FIG. 11 is a cross-sectional view of the portion of the rotary spray head assembly shown in FIG. 9, taken along line 11-11 in FIG. 9.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIG. 4 of the drawings illustrates a fluid sprayer 10 including a fluid storage module 14 and a dispersion module 18 having a rotary spray head assembly 22 in fluid communication with the fluid storage module 14 to receive fluid therefrom and atomize the fluid. In the illustrated construction, a liquid insecticide is held in at least one tank 26 of the fluid storage module 14 and atomized by the rotary spray head assembly 22. Alternatively, any of a number of different liquids may be held in the fluid storage module 14 for subsequent atomization and dispersal by the rotary spray head assembly 22. With continued reference to FIG. 4, the dispersion module 18 also includes a blower assembly 30 positioned upstream of the rotary spray head assembly 22 for dispersing the atomized fluid from the rotary spray head assembly 22 into the surroundings of the fluid sprayer 10. Further description regarding the structure and operation of the fluid sprayer 10 is contained below.

With reference to FIG. 1, the rotary spray head assembly 22 includes a motor 34 having an output shaft 38 and a multi-piece housing 42 through which the output shaft 38 at least partially extends. In the illustrated construction of the rotary spray head assembly 22, the multi-piece housing 42 includes a front housing portion 44, an intermediate housing portion 45, and a rear housing portion 46 that are attached to each other by fasteners (not shown). The front and rear housing portions 44, 46 support respective bearings for rotatably supporting the front and rear of the output shaft 38. Although not shown, one or more seals (e.g., O-rings) may be positioned between adjacent portions of the multi-piece housing 42 to inhibit leakage of fluid through the interface between the respective housing portions 44, 45, 46.

Figure 1:
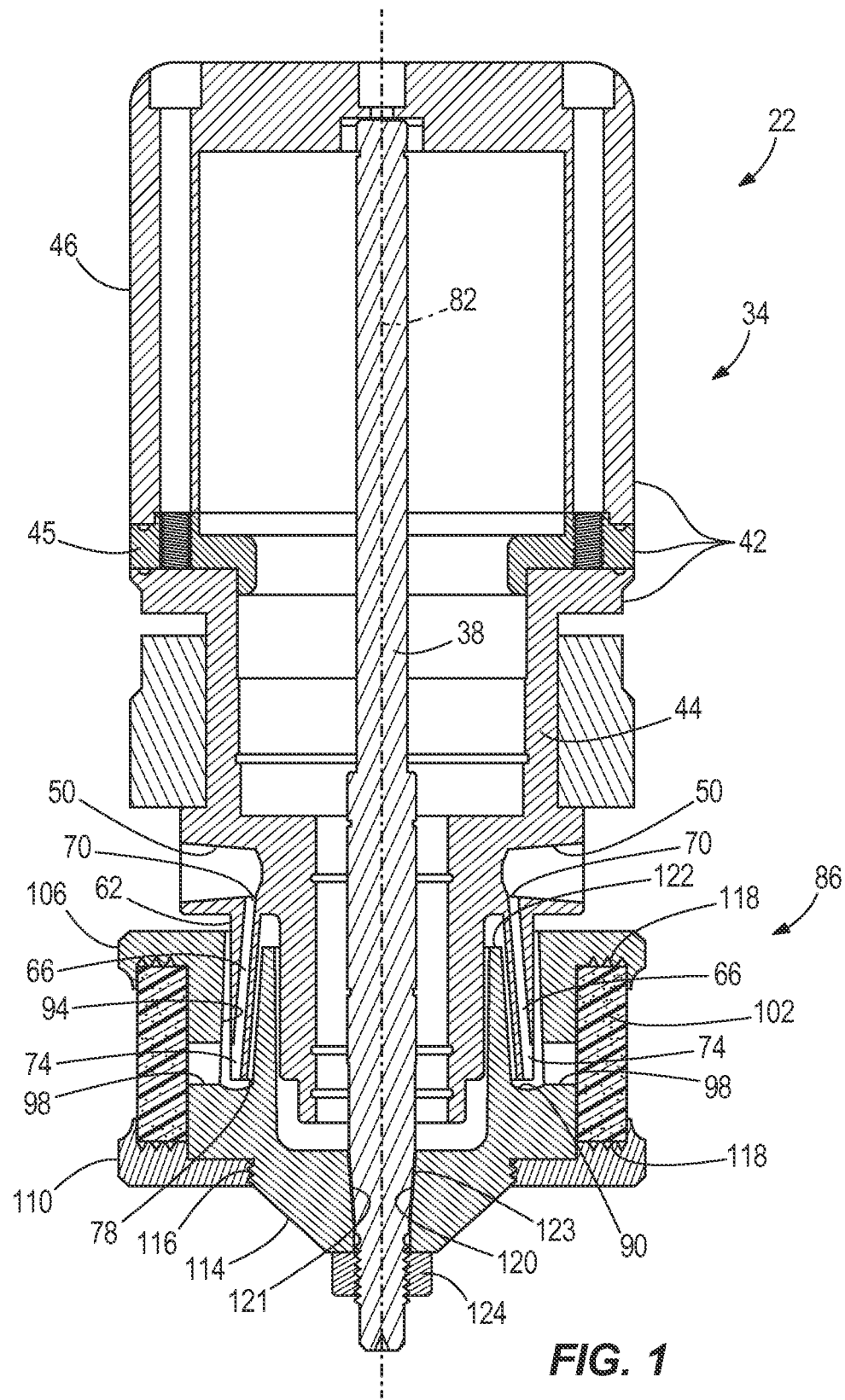
Figure 7:
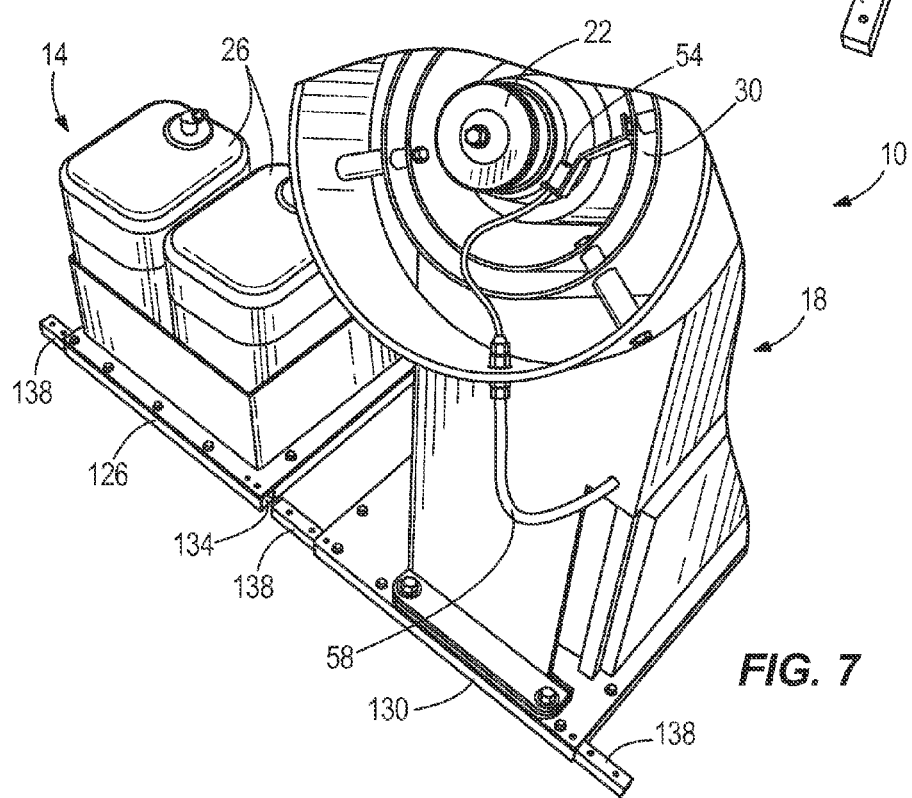
Figure 8:
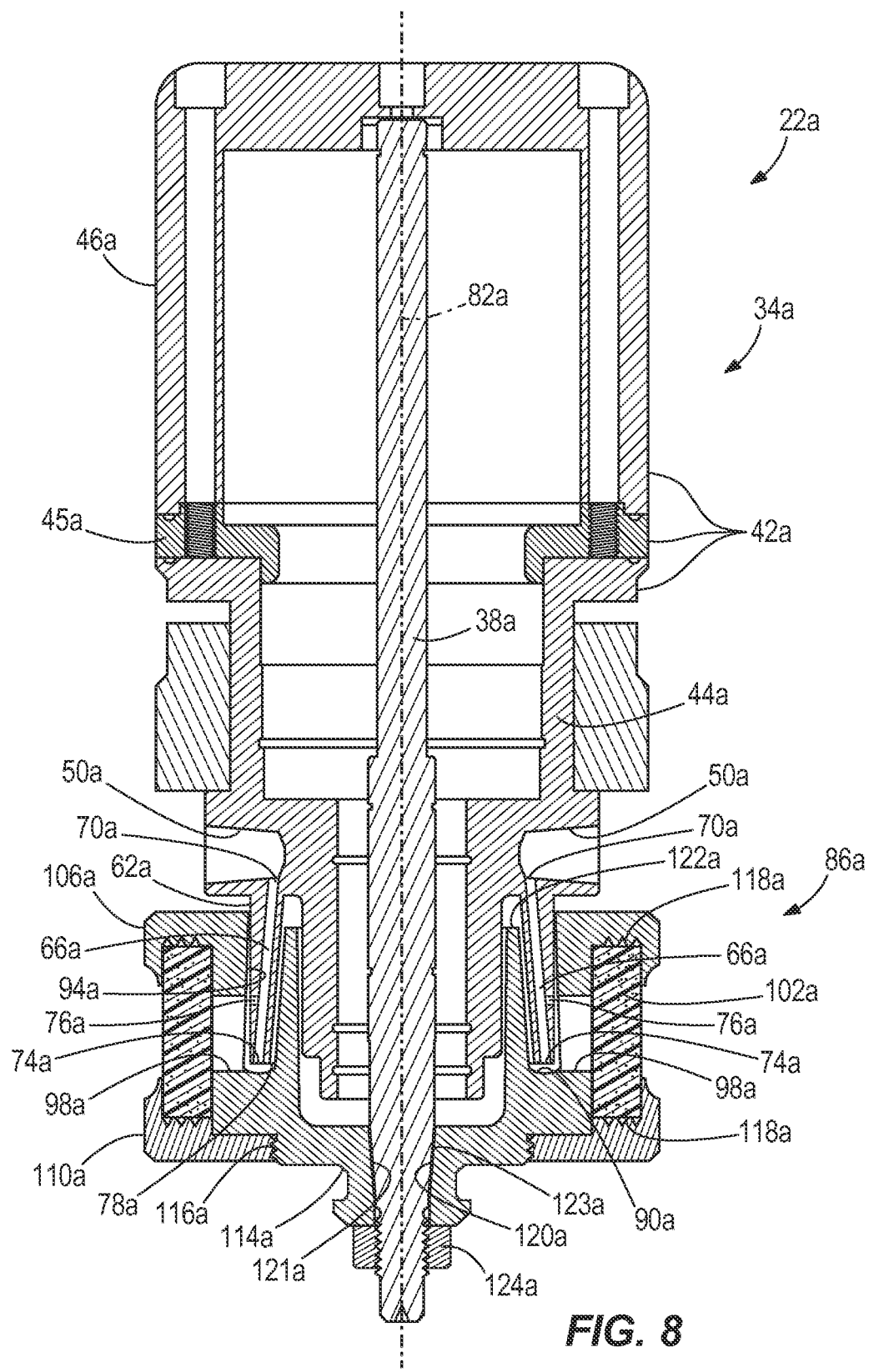
Figure 9:
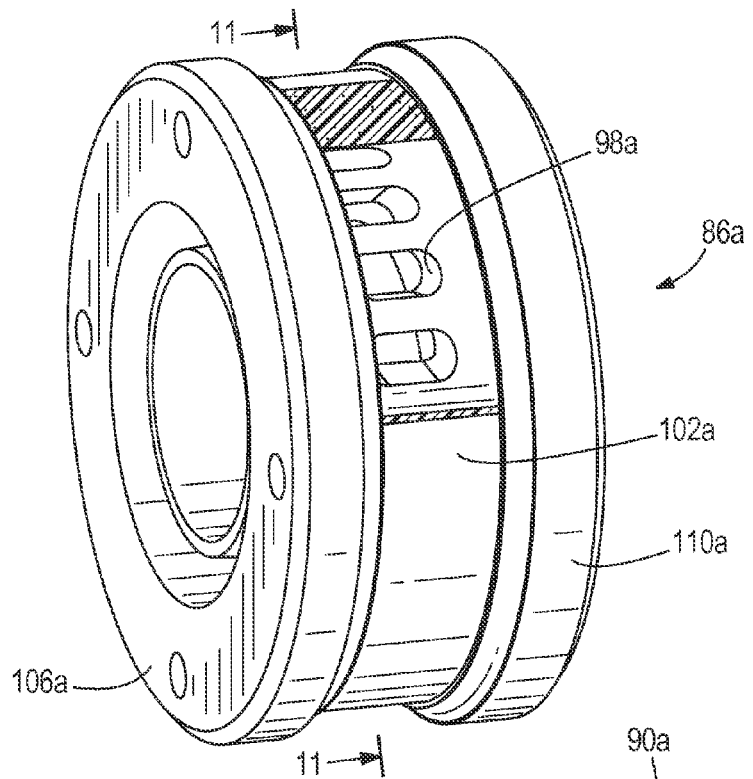
Figure 10:
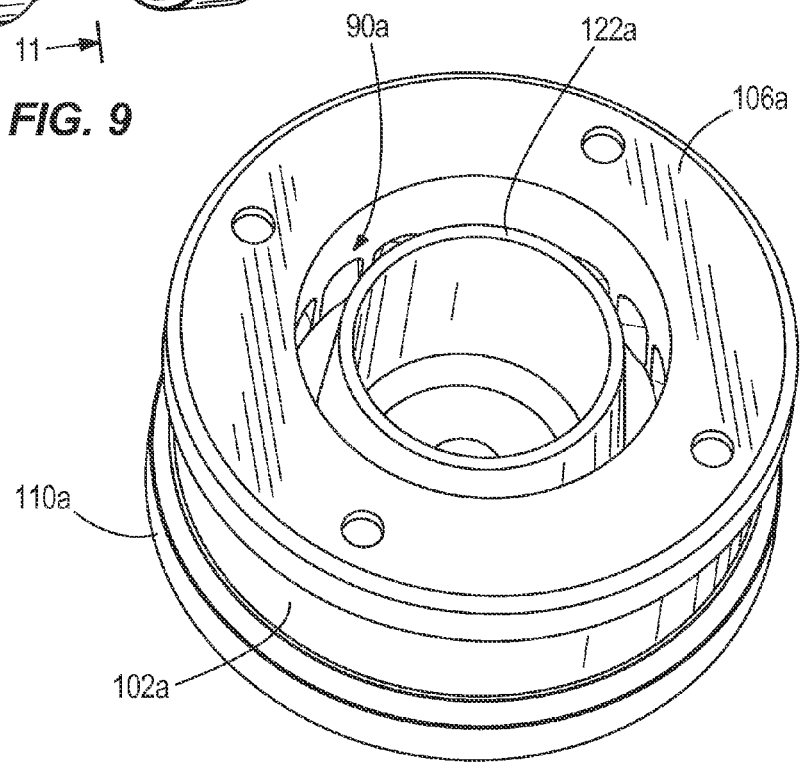
Figure 11:
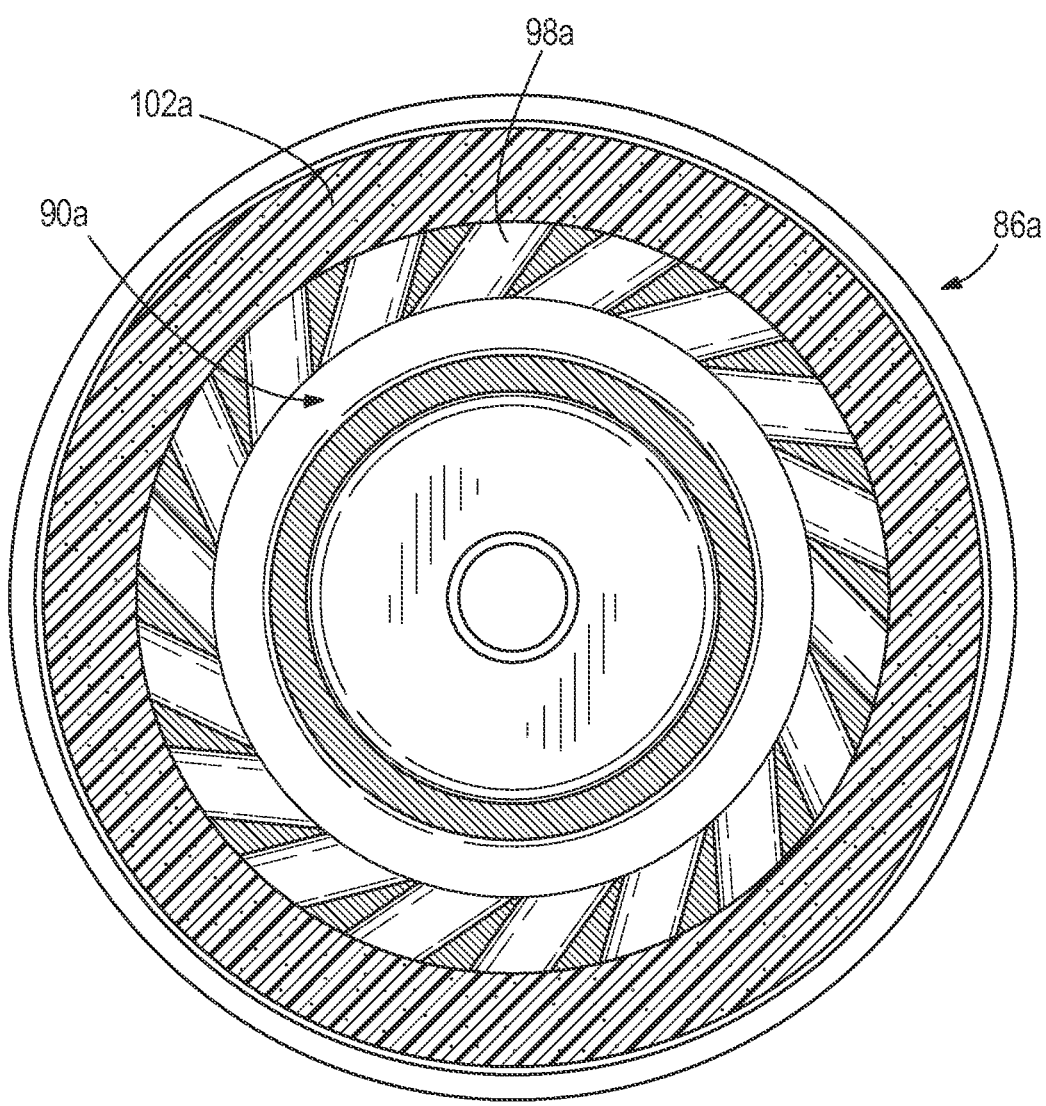

The front housing portion 44 includes first and second inlets 50 that are communicable with a source of fluid (e.g., insecticide contained in the fluid storage module 14). Particularly, each of the inlets 50 is a threaded bore to which a fluid fitting 54 is attached (FIG. 7). One or more lengths of flexible tubing 58 interconnects the fitting 54 to the fluid storage module 14 to deliver fluid to the rotary spray head assembly 22. With reference to FIG. 1, the front housing portion 44 includes an annular skirt 62 extending therefrom, and first and second passageways 66 through the skirt 62 each having a first end 70 in fluid communication with the respective first and second inlets 50 of the front housing portion 44. The first and second passageways 66 also each include a second end 74 disposed proximate a rim 78 on the skirt 62 and facing radially outwardly. Each of the passageways 66 is oriented generally in the direction of a longitudinal axis 82 of the output shaft 38. As such, fluid passing through the passageways 66 passes along the output shaft 38 in generally the same direction and is discharged from the second ends 74 of the respective passageways 66 radially outwardly and substantially normal to the longitudinal axis 82.

In the illustrated construction of the rotary spray head assembly 22, the skirt 62 includes a diverging tapered shape relative to the longitudinal axis 82 of the output shaft 38. In other words, the skirt 62 flares or tapers radially outwardly as the skirt 62 extends farther away from the front housing portion 44 in the direction of the longitudinal axis 82. Alternatively, the skirt 62 may include a converging tapered shape or the skirt 62 may be non-tapered (i.e., straight or tubular).

With continued reference to FIG. 1, the first and second passageways 66 are formed in a common plane passing through the skirt 62 and the longitudinal axis 82 of the output shaft 38. In other words, the inlets 50 and the respective passageways 66 are positioned 180 degrees opposite one another. Alternatively, the rotary spray head assembly 22 may include only a single inlet 50 and corresponding passageway 66, or more than two inlets 50 and corresponding passageways 66. Furthermore, the rotary spray head assembly 22 may include only a single inlet 50 and multiple passageways 66 each having a first end 70 in fluid communication with the single inlet 50.

Figure 2:
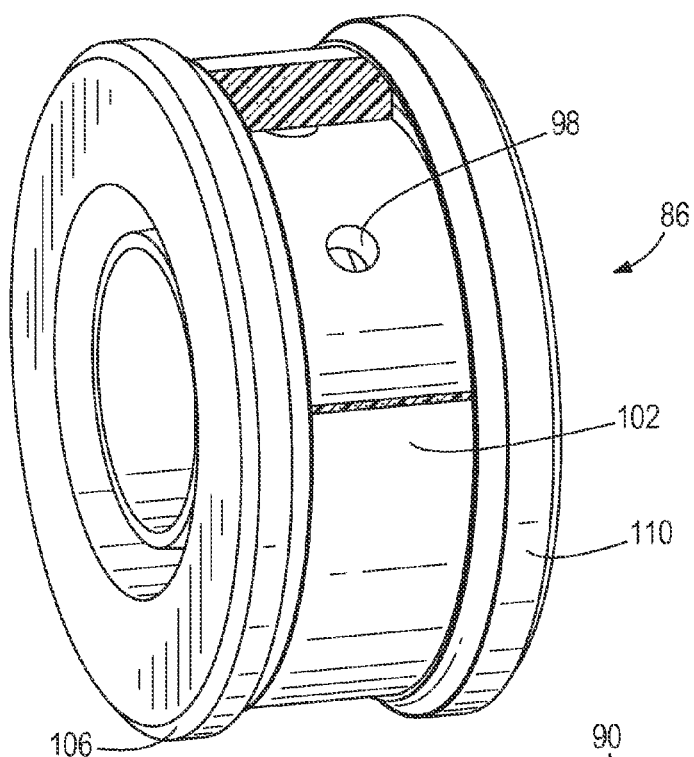
Figure 3:
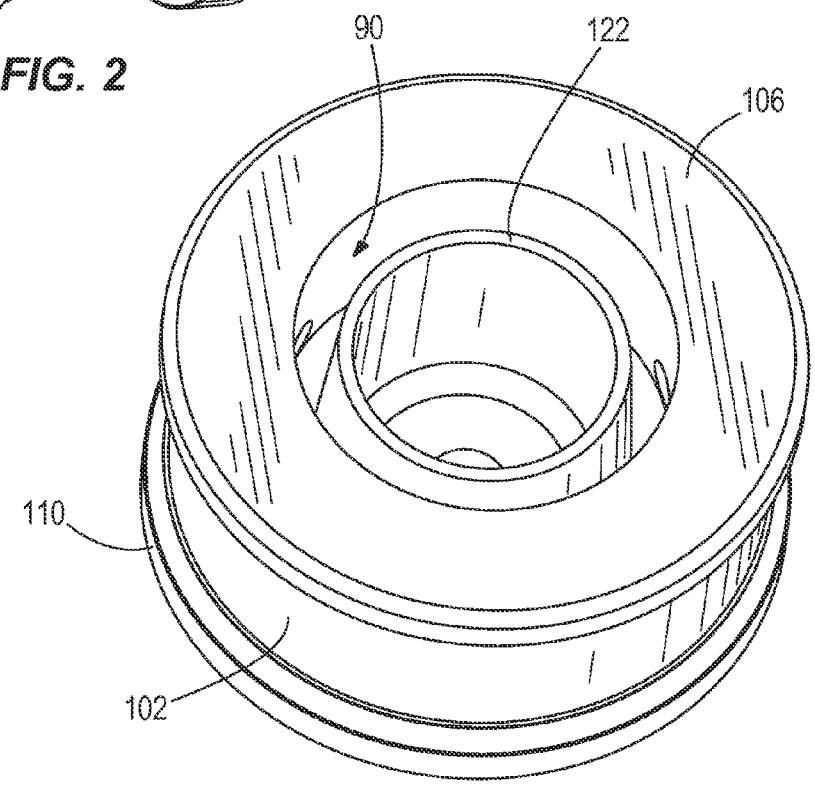
Figure 4:
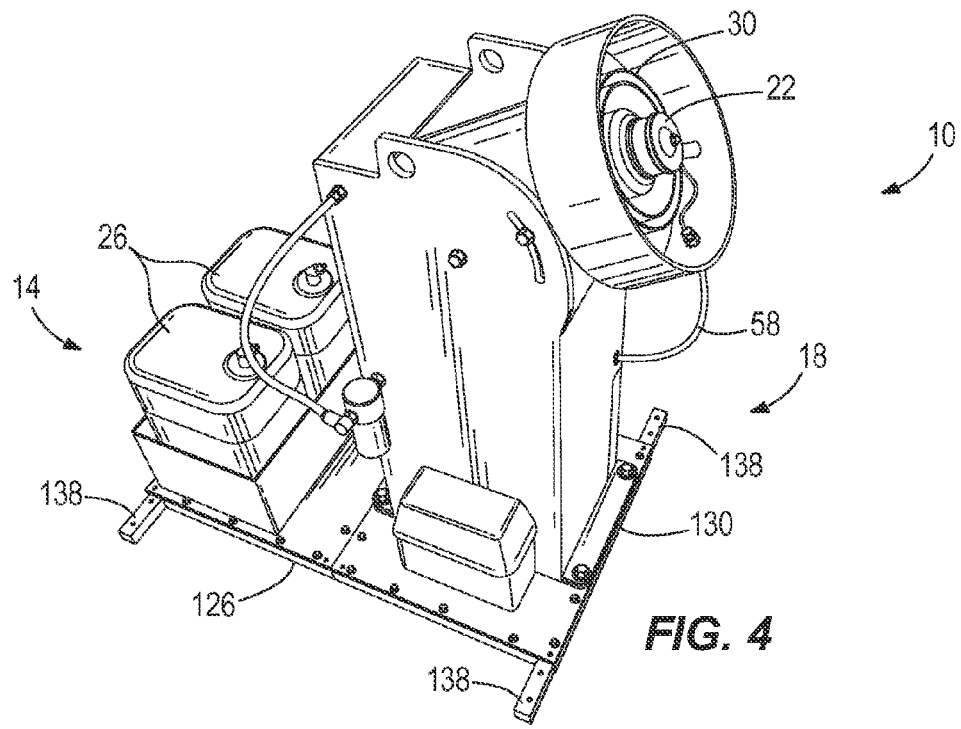
Figure 5:
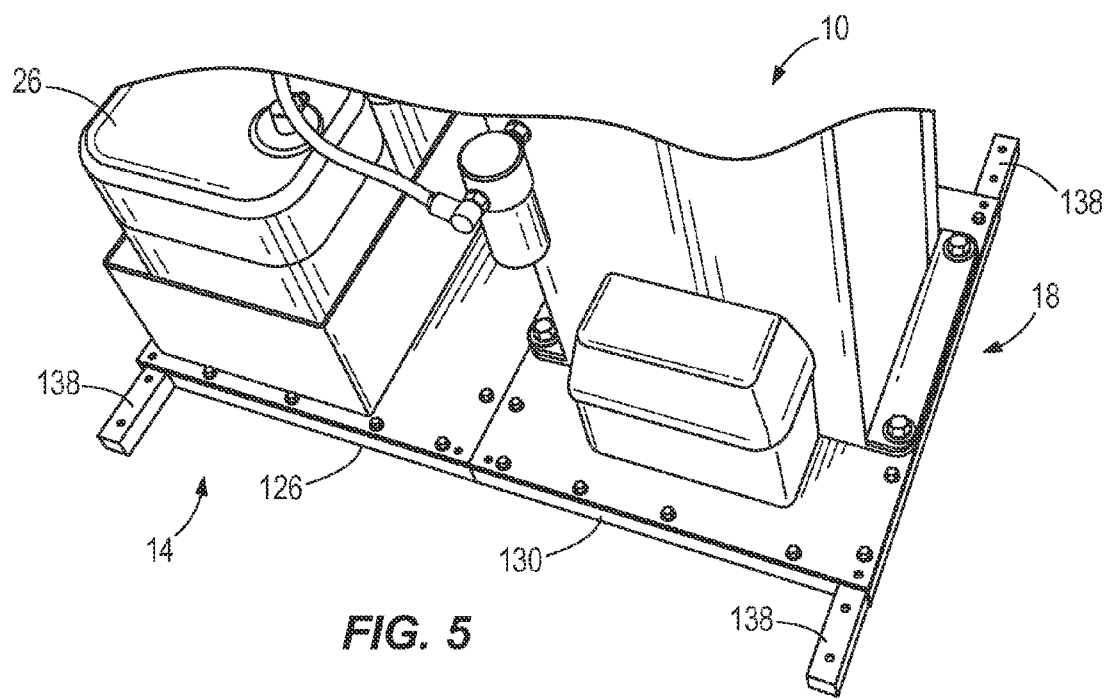
Figure 6:
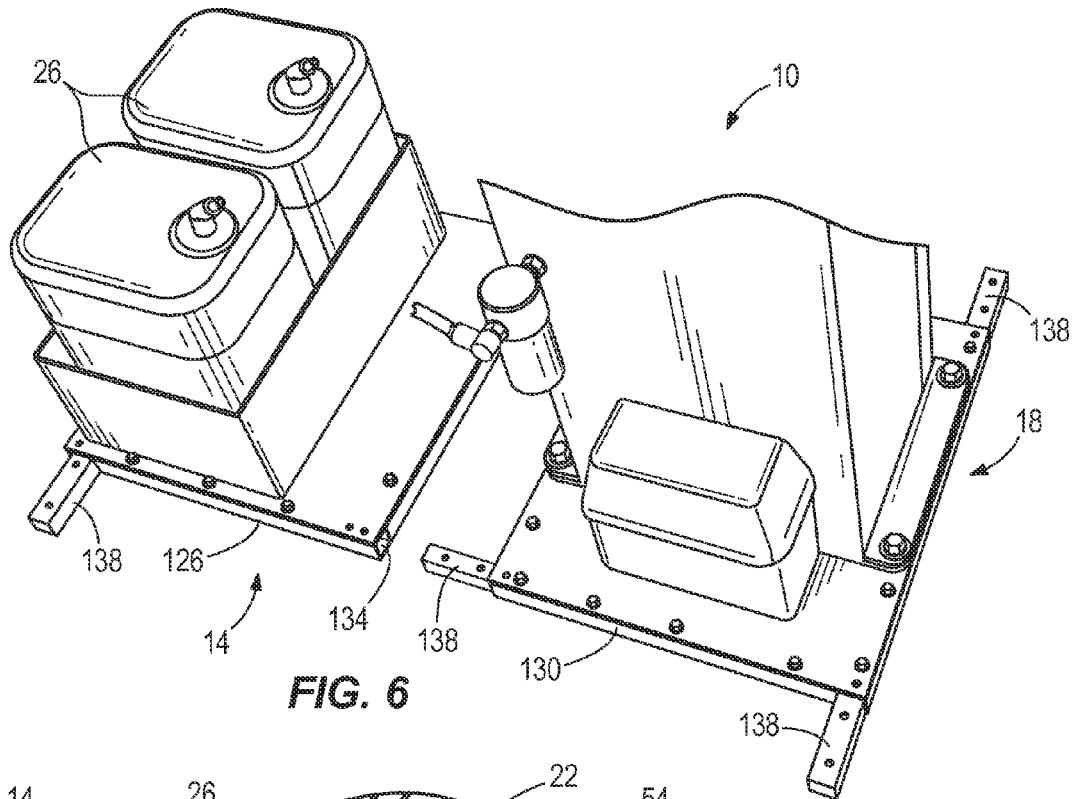

The rotary spray head assembly 22 further includes a hub 86 coupled for co-rotation with the output shaft 38 about the longitudinal axis 82. The hub 86 includes an annular groove 90 into which the annular skirt 62 at least partially extends, a circumferential interior surface 94 at least partially defining the groove 90, and radially extending apertures 98 through the circumferential interior surface 94 (only two of which are shown in FIG. 1; see also FIG. 2). As will be described in more detail below, fluid introduced into the annular groove 90 through the second ends 74 of the respective passageways 66 is discharged radially outwardly through the apertures 98.

The rotary spray head assembly 22 also includes a porous sleeve 102 coupled to the hub 86 and positioned radially outwardly of the apertures 98 for atomizing the fluid discharged from the apertures 98 (FIGS. 1 and 2). In particular, the sleeve 102 is made of a polymer (e.g., ultra-high molecular weight polyethylene, high-density polyethylene, etc.) having pores with a nominal 10 micron diameter. As such, fluid passing through the sleeve 102 as a result of centrifugal force acting on the fluid is atomized to droplets having a nominal 10 micron diameter. Alternatively, the droplets dispersed by the rotary spray head assembly 22 may have a nominal diameter between about 5 microns and about 50 microns, depending upon the particular pore size of the sleeve 102. As a further alternative, the sleeve 102 may include a different pore size depending upon the fluid being used with the rotary spray head assembly 22 and the rotational speed of the hub 86.

With continued reference to FIGS. 1 and 2, the hub 86 includes inboard and outboard flanges 106, 110 between which the sleeve 102 is secured. Particularly, the inboard flange 106 is integrally formed with the portion of the hub 86 defining the annular groove 90 and a central mounting portion 114 of the hub 86, while the outboard flange 110 is coupled to the central mounting portion 114 of the hub 86 using a left-handed threaded connection 116 (FIG. 1). As such, the sleeve 102 may be removed from the hub 86 by unthreading the outboard flange 110 from the central mounting portion 114 of the hub 86 to access the sleeve 102. Each of the flanges 106, 110 includes a series of concentric circular ridges 118 in contact with the sleeve 102 to increase the frictional force exerted on the sleeve 102 to inhibit relative rotation between the sleeve 102 and the hub 86. Alternatively, the ridges 118 may be replaced with a knurled surface on each of the flanges 106, 110.

With continued reference to FIG. 1, the central mounting portion 114 of the hub 86 includes an aperture 120 through which the output shaft 38 extends. The aperture 120 includes an internal tapered surface 121, and the output shaft 38 includes an external, corresponding tapered surface 123 to permit the hub 86 to be press-fit to the output shaft 38. A nut 124 is threaded to a threaded portion 125 of the output shaft 38 to maintain the press-fit of the hub 86 to the output shaft 38. The hub 86 may be removed from the output shaft 38 by removing the nut 124 and using a pulling tool to separate the tapered surfaces 121, 123 of the hub 86 and the output shaft 38, respectively.

The hub 86 includes an annular barrier wall 122 at least partially defining the annular groove 90. The barrier wall 122 extends toward the front housing portion 44 and surrounds the output shaft 38. The circumferential interior surface 94 of the hub 86 surrounds the barrier wall 122 and substantially defines the annular groove 90 in conjunction with the barrier wall 122. In other words, when the hub 86 is removed from the remainder of the rotary spray head assembly 22, the barrier wall 122 and the circumferential interior surface 94 are in facing relationship with each other (FIG. 3). As shown in FIG. 1, the skirt 62 and the barrier wall 122 axially overlap such that a combination of the skirt 62 and the barrier wall 122 defines a tortuous path between the annular grove 90 and the output shaft 38, thereby inhibiting fluid in the annular groove 90 from migrating radially inwardly toward the output shaft 38. As a result, the output shaft 38 is exposed to less fluid over the lifetime of the rotary spray head assembly 22, reducing the amount of fluid intrusion that might otherwise occur along the output shaft 38 and into the multi-piece housing 42, which includes electronic components that facilitate operation of the motor 34.

With continued reference to FIG. 1, the second ends 74 of the respective passageways 66 are in facing relationship with the circumferential interior surface 94 of the hub 86. As such, in operation of the rotary spray head assembly 22, fluid under a low pressure (i.e., at about 10 psi or less) is introduced to the rotary spray head assembly 22 through the inlets 50 and is subsequently discharged from the second ends 74 of the respective passageways 66 against the circumferential interior surface 94. The hub 86 is rotated by the motor 34 at a high rate of speed (e.g., 30,000 revolutions per minute). Consequently, centrifugal force acting on the fluid causes it to spread out over the circumferential length of the interior surface 94 and form a thin film over the circumferential interior surface 94. Some of the fluid, however, may directly pass through one or more of the apertures 98 depending upon the position of the one or more apertures 98 as they rotate past the second ends 74 of the respective passageways 66. The fluid accumulated as the thin film is then flung radially outwardly through the apertures 98 by centrifugal force, where it impacts the interior of the porous sleeve 102. Centrifugal force continues to act on the fluid, causing it to move through the pores in the sleeve 102. The fluid is then discharged from the porous sleeve 102 in a radial direction as atomized droplets for dispersion throughout the surroundings of the rotary spray head assembly 22 by the blower assembly 30

16. The nozzle assembly of claim 15, wherein the second end of the passageway is in facing relationship with a bottom of the annular groove.

17. The nozzle assembly of claim 1, wherein the output shaft defines a longitudinal axis, and wherein the aperture is canted or inclined relative to a plane containing the longitudinal axis.

18. The nozzle assembly of claim 17, wherein the aperture includes an oblong shape with a major axis extending in a direction parallel with the longitudinal axis.

* * * * *